US010808070B2

(12) United States Patent
Böhnke et al.

(10) Patent No.: US 10,808,070 B2
(45) Date of Patent: Oct. 20, 2020

(54) HIGH TEMPERATURE-RESISTANT POLYISOCYANURATE FOAMS

(71) Applicant: Covestro Deutschland AG, Leverkusen (DE)

(72) Inventors: Lutz Böhnke, Overath (DE); Dirk Achten, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 30 days.

(21) Appl. No.: 16/318,391

(22) PCT Filed: Jul. 12, 2017

(86) PCT No.: PCT/EP2017/067532
§ 371 (c)(1),
(2) Date: Jan. 17, 2019

(87) PCT Pub. No.: WO2018/015245
PCT Pub. Date: Jan. 25, 2018

(65) Prior Publication Data
US 2019/0233574 A1  Aug. 1, 2019

(30) Foreign Application Priority Data
Jul. 21, 2016  (EP) .................................... 16180611

(51) Int. Cl.
| C08G 18/73 | (2006.01) |
| C08J 9/00 | (2006.01) |
| C08G 18/10 | (2006.01) |
| C08G 18/79 | (2006.01) |
| C08G 18/72 | (2006.01) |
| C08G 18/32 | (2006.01) |
| C08G 18/22 | (2006.01) |
| C08G 18/76 | (2006.01) |
| C08G 18/08 | (2006.01) |
| C08G 18/48 | (2006.01) |
| C08K 5/11 | (2006.01) |
| C08K 5/13 | (2006.01) |
| C08K 5/19 | (2006.01) |
| C08G 101/00 | (2006.01) |
| C08G 18/09 | (2006.01) |

(52) U.S. Cl.
CPC ........... *C08G 18/792* (2013.01); *C08G 18/14* (2013.01); *C08G 18/222* (2013.01); *C08G 18/225* (2013.01); *C08G 18/3206* (2013.01); *C08G 18/4841* (2013.01); *C08G 18/722* (2013.01); *C08G 18/724* (2013.01); *C08G 18/73* (2013.01); *C08G 18/7671* (2013.01); *C08K 5/11* (2013.01); *C08K 5/13* (2013.01); *C08K 5/19* (2013.01); *C08G 18/092* (2013.01); *C08G 2101/0025* (2013.01); *C08G 2105/02* (2013.01)

(58) Field of Classification Search
CPC .... C08G 18/792; C08G 18/14; C08G 18/222; C08G 18/225; C08G 18/3206; C08G 18/4841; C08G 18/72; C08G 18/73; C08G 2101/00
See application file for complete search history.

(56) References Cited

U.S. PATENT DOCUMENTS

| 3,645,979 | A | 2/1972 | Liebsch et al. |
| 4,324,879 | A | 4/1982 | Bock et al. |
| 4,419,513 | A | 12/1983 | Breidenbach et al. |
| 6,602,927 | B1* | 8/2003 | Rothacker ............ C08G 18/092 521/128 |
| 2003/0187085 | A1 | 10/2003 | Sato et al. |
| 2004/0082465 | A1* | 4/2004 | Kiso ..................... C08G 18/18 502/167 |
| 2011/0082226 | A1 | 4/2011 | Tsai et al. |

(Continued)

FOREIGN PATENT DOCUMENTS

| CA | 2028678 A1 | 5/1991 |
| DE | 3938062 A1 | 5/1991 |

(Continued)

OTHER PUBLICATIONS

International Preliminary Report on Patentability with Written Opinion for International Application No. PCT/EP2017/067532, dated Jan. 31, 2019.

(Continued)

*Primary Examiner* — Kara B Boyle
(74) *Attorney, Agent, or Firm* — Faegre Drinker Biddle & Reath LLP

(57) ABSTRACT

The present invention relates to a polyisocyanurate foam obtainable by reacting a mixture in the presence of a catalyst and optionally an initiator, comprising or consisting of:
A) a polyisocyanate component comprising at least one aliphatic polyisocyanate;
B) a component reactive to isocyanate comprising at least one polyol and/or an alcohol and also optionally an amine;
C) at least one blowing agent;
D) at least one foam stabilizer and
E) optionally at least one additive,
characterized in that
the mixture, upon accompanying use of an isocyanate-reactive component (polyol, alcohol, amine), has an index of at least 200. The invention further relates to a process for producing such a foam and use thereof as an insulating material, as a construction element, as facade insulation, as reactor insulation, as battery insulation, as superheated steam insulation, as insulation for a still, or as weather-resistant insulating material.

15 Claims, 1 Drawing Sheet

(56) References Cited

U.S. PATENT DOCUMENTS

| | | |
|---|---|---|
| 2014/0093721 A1 | 4/2014 | Wegener et al. |
| 2015/0118476 A1* | 4/2015 | Bertucelli .......... C08G 18/4018 |
| | | 428/304.4 |
| 2015/0274967 A1* | 10/2015 | Taylor .................. C08G 18/225 |
| | | 521/107 |
| 2016/0115289 A1 | 4/2016 | Albach et al. |

FOREIGN PATENT DOCUMENTS

| | | |
|---|---|---|
| EP | 0010589 A1 | 5/1980 |
| EP | 0047452 A1 | 3/1982 |
| GB | 1104394 A | 2/1968 |
| GB | 1137459 A | 12/1968 |
| WO | WO-2007042411 A1 | 4/2007 |
| WO | WO-2012150201 A2 | 11/2012 |

OTHER PUBLICATIONS

International Search Report for PCT/EP2017/067532 dated Aug. 22, 2017.
Written Opinion of the International Searching Authority for PCT/EP2017/067532 dated Aug. 22, 2017.

* cited by examiner

Example representation of a pure polyisocyanurate structure.
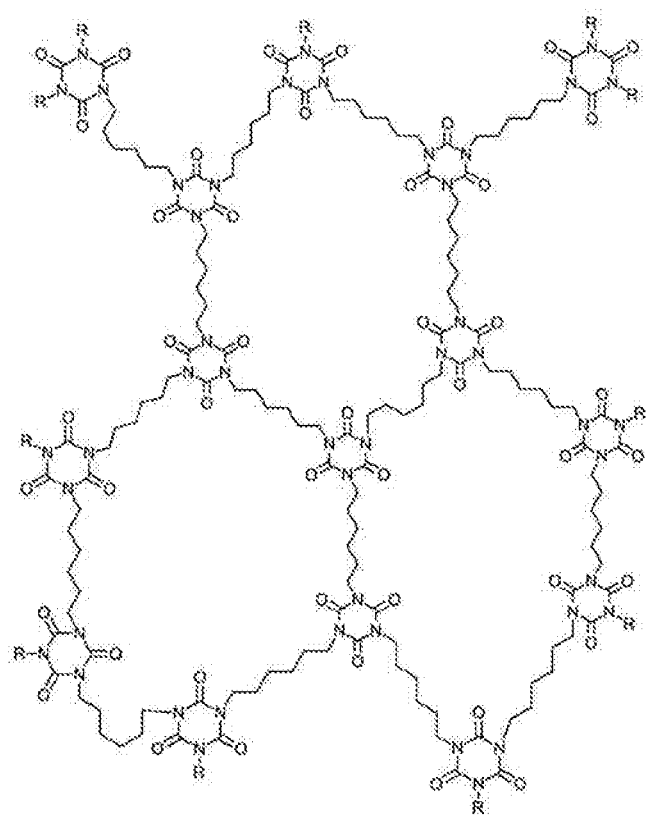

HIGH TEMPERATURE-RESISTANT POLYISOCYANURATE FOAMS

CROSS-REFERENCE TO RELATED APPLICATIONS

This application is a national stage application (under 35 U.S.C. § 371) of PCT/EP2017/067532, filed Jul. 12, 2017, which claims benefit of European Application No. 16180611.2, filed Jul. 21, 2016, both of which are incorporated herein by reference in their entirety.

The present invention relates to a polyisocyanurate foam obtainable by reacting a mixture in the presence of a catalyst and optionally an initiator, comprising or consisting of:
- A) a polyisocyanate component comprising at least one aliphatic polyisocyanate;
- B) a component reactive to isocyanate comprising at least one polyol and/or an alcohol and also optionally an amine;
- C) at least one blowing agent;
- D) at least one foam stabilizer and
- E) optionally at least one additive.

The invention further relates to a process for producing such a foam and also use thereof.

BACKGROUND OF THE INVENTION

Polyurethane and polyisocyanurate foams based on aromatic isocyanates rank among absolutely the best insulating materials. With respect to temperature resistance however, polyurethane foams are surpassed by many other insulating materials. For instance, according to WO 2012/150201 A2 for example, foams comprising oxazolidinone structures have a distinctly better temperature resistance.

The fact that isocyanurate groups are significantly more thermally resistant than urethane groups has long been known (K. Wagner, Angew. Chem. 74, 1962, 799). For many years therefore, polyisocyanurate foams have been used for thermally demanding insulation (Heat Resistant Rigid Foams by Trimerization of Isocyanate Terminated Prepolymers, Journal of Cellular Plastics, January 1965, Vol. 1, No. 1, 85-90, GB1137459A).

Nowadays, rigid polyurethane-polyisocyanurate (PUR-PIR) foams are produced using at least one catalyst by reacting a polyol component with an isocyanate component in the presence of a blowing agent. Additives can moreover also be added, examples being foam stabilizers and flame retardants. Rigid PUR-PIR foams are distinguished from other rigid foams, for example rigid PUR foams, by having significantly better thermal stability and improved fire properties (US 2003/0187085 A1). These improved properties are attributed to isocyanurate structural elements.

The temperature resistance of polyisocyanurate foams exceeds that of polyurethane foams by ca. 30° C. to 40° C. However—as already mentioned above—these are not pure polyisocyanurate foams, the isocyanurate proportion typically being between 40 and 75%, depending on the index. This means however that a not inconsiderable proportion of urethane groups, and in the case of water-blown foams also urea groups, is present in addition to the isocyanurate groups. However, urea and urethane groups have a lower temperature stability than isocyanurate groups.

In order to increase the temperature stability, polyisocyanurate foams have been reacted in a multi-stage process with epoxides for example (e.g.: GB 1104394 and DE 3938062 A1). Virtually pure aromatic polyisocyanurates (index from 1600 to 100 000) are described in WO 2007/042411 A1, wherein water is preferably used as blowing agent. However, this has the consequence that the foam consists of polyurea and polyisocyanurates. Such pure aromatic polyurea-polyisocyanurate foams are rather brittle however.

The production of polyisocyanurates (U.S. Pat. No. 3,645, 979 A) is described in the prior art mainly starting from liquid monomeric diisocyanates (e.g. stearyl diisocyanate, dodecyl diisocyanate, decyl diisocyanate, nonyl diisocyanate, octyl diisocyanate, hexamethylene diisocyanate (HDI), butamethylene diisocyanate (BDI), pentamethylene diisocyanate (PDI), isophorone diisocyanate (IPDI), 4,4'-diisocyanatodicyclohexylmethane ($H_{12}MDI$), toluene diisocyanate (TDI), diphenylmethane diisocyanate (MDI) (4,4'-diphenylmethane diisocyanate, 2,4'-diphenylmethane diisocyanate, 2,2'-diphenylmethane diisocyanate), naphthalene-1,5-diisocyanate (NDI), 2,5-(and 2,6-)-bis(isocyanatomethyl)bicyclo[2.2.1]heptane (NBDI)), of aliphatic and aromatic nature alike. The reaction enthalpy of the trimerization reaction to polyisocyanurates is very high at −75 kJ/mol NCO. In the production of polyisocyanurate foams, this leads in particular to problems since porous materials in general and foams in particular have very low thermal conductivity and therefore a quasi-adiabatic reaction regime takes place which results in a significant temperature increase. Thus, it is not possible to carry out a reaction for large-volume foam bodies under the existing virtually adiabatic conditions, starting from monomeric diisocyanates, particularly monomeric di- and triisocyanates with high isocyanate content (e.g. BDI, PDI, HDI, TIN), but can be enabled either only in small amounts of substance or under stricter temperature control, i.e. for example with a small surface volume ratio such as in molding tools or in twin conveyor belt processes.

BRIEF SUMMARY OF THE INVENTION

The object of the present invention is the provision of a high temperature-resistant insulation foam (also referred to below as polyisocyanurate foam or rigid foam) and production thereof by a process which is suitable for efficiently producing large-volume foam bodies, in which the uncontrolled significant heat evolution during the reaction described for polyisocyanurate foams in the prior art. Which is associated with an uncontrolled foaming reaction and therefore qualitatively substandard foams with respect to heat insulation effect, is avoided. The high temperature-resistant polyisocyanurate foam should additionally preferably have a mass loss of at most 2.0%, preferably 1.5%, more preferably 1.0% at ≤200° C., determined by thermogravimetry in a temperature range from 20 to 200° C. at a heating rate of 20° C./minute in a nitrogen atmosphere. In addition, the reaction mixture on which the high temperature-resistant foam is based should be manageable with respect to process safety. FIG. 1 shows an example representation of a pure polyisocyanurate structure.

BRIEF DESCRIPTION OF THE DRAWINGS

FIG. 1 shows an Example representation of a pure polyisocyanurate structure.

DETAILED DESCRIPTION OF THE INVENTION

The object was achieved by a polyisocyanurate foam obtainable by reacting a mixture in the presence of a catalyst and optionally an initiator, comprising or consisting of:

A) a polyisocyanate component comprising at least one aliphatic polyisocyanate;
B) a component reactive to isocyanate comprising at least one polyol and/or an alcohol and also optionally an amine;
C) at least one blowing agent;
D) at least one foam stabilizer and
E) optionally at least one additive, wherein the mixture is characterized in that it has an index of at least 200, preferably at least 400, particularly preferably at least 1000.

The index gives NCO-reactive equivalents in a ratio to the active H functions, usually OH or NH equivalents (Kunststoffhandbuch 7, Polyurethane, 1983, p. 12).

The index is calculated according to the following equation, $$\text{Index} = \frac{100 \cdot \text{NCO\_equivalents}}{\text{OH\_equivalents}}$$

The indeterminate expression "a" generally means "at least one" in the sense of "one or more". According to the situation, it will be apparent to the person skilled in the art that what must be meant is not the indeterminate article but the determinate article "one", or that the indeterminate article "a" also encompasses, in one embodiment, the determinate article "one".

It has been found that, surprisingly, in the production of polyisocyanurate foams starting from predominantly aliphatic polyisocyanurates, compared to the known foaming of monomeric aromatic or aliphatic isocyanates having a high index, a foaming reaction that is easy to control is possible. It is possible to obtain high temperature-resistant foams having a thermal conductivity in the range of modern rigid PUR foams of <0.05 W/(mK), preferably <0.04 W/(mK) and particularly preferably <0.035 W/(mK) and a bulk density <100 kg/m$^3$, preferably <80 kg/m$^3$ and particularly preferably <70 kg/m$^3$.

Starting compounds for the polyisocyanate component A) for the process according to the invention are preferably di- and polyisocyanates having aliphatically, cycloaliphatically and/or araliphatically bonded isocyanate groups optionally in the presence of polyisocyanates, wherein preferably at most 30% of all isocyanate groups are aromatic isocyanate groups. Isocyanates of this kind are typically prepared by phosgenation, but may also be prepared by a phosgene-free route, for example by urethane cleavage. In a preferred case, the products of a controlled trimerization of diisocyanates are used as starting compounds liquid at room temperature (23° C.) (EP 0010589 A1, EP 0047452 A1).

The polyisocyanate component A) preferably has a viscosity in accordance with DIN EN ISO 3219:1994-10 at 23° C. of 100 to 30 000 mPas, preferably 500 to 25 000 mPas, more preferably 800 to 22 500 mPas.

It is advantageous if at least 50% by weight, especially 70% by weight aliphatic isocyanates are used, based on the total weight of A). Advantageous are isocyanurate group-containing polyisocyanates based on 1,6-diisocyanatohexane (HDI) having an NCO content <25% by weight and an average NCO functionality of >2.

For compatibilization, particularly in the presence of polar, chemical blowing agents such as water and/or formic acid, at least a proportion of hydrophilized isocyanurate group-containing polyisocyanates are used, preferably >1%, particularly preferably >3%, especially preferably >5%.

Such hydrophilized isocyanurate group-containing polyisocyanates are obtained, for example, by reacting polyisocyanurates with hydrophilic compounds bearing at least one group reactive to isocyanate. Typical suitable compounds for controlled hydrophilization of isocyanates are well-known to those skilled in the art, for example polyethers, polyesters and compounds bearing sulfonic acid groups. Covestro Deutschland AG offers such compounds under the name Bayhydur® for use as crosslinkers in the coatings industry.

Particular preference is given to a polyisocyanate component A) having a proportion of monomeric diisocyanates in the polyisocyanate composition A) of at most 50% by weight, advantageously of at most 25% by weight and particularly advantageously of at most 10% by weight, based in each case on the total weight of polyisocyanate component A). The low-monomer polyisocyanate component A) and the oligomeric polyisocyanates present therein are typically obtained by modifying simple aliphatic, cycloaliphatic, araliphatic and/or aromatic monomeric diisocyanates or mixtures of such monomeric diisocyanates.

Aromatic polyisocyanates (p-MDI) can also optionally be used in addition, in order to increase the glass transition temperature for example.

The oligomeric polyisocyanates may, in accordance with the invention, especially have uretdione, isocyanurate, allophanate, biuret, iminooxadiazinedione and/or oxadiazinetrione structure. Particularly preferred are polyisocyanates having proportions of isocyanurate groups of >10% by weight, especially preferably >20% by weight, in polyisocyanate component A).

Irrespective of the underlying oligomeric structure (uretdione, isocyanurate, allophanate, biuret, iminooxadiazinedione and/or oxadiazinetrione structure), the polyisocyanate component A for use in the process according to the invention and/or the oligomeric polyisocyanates present therein preferably have a (mean) NCO functionality of 2.0 to 6, preferably of 2.3 to 4.0.

Particularly preferred results are established when the polyisocyanate component A) to be used in accordance with the invention has a content of isocyanate groups of 15 to 40% by weight, preferably of 20 to 30% by weight, based in each case on the total polyisocyanate composition A).

Suitable commercially available polyisocyanates are, inter alia, Desmodur XP 2675, Desmodur® XP 2489, Desmodur® N3300, Desmodur® N3600, Desmodur® 44M, Desmodur® H, Bayhydur® 3100, all obtainable from Covestro Deutschland AG.

Isocyanate-reactive component B) comprises in accordance with the invention at least one polyol and/or an alcohol and also optionally an amine. Diols and triols are preferably used as polyols. Suitable polyols of the isocyanate-reactive component B) preferably have a boiling point at 1 bar of >150° C.

Examples of preferred diols are ethylene glycol, butylene glycol, triethylene glycol, diethylene glycol, polyalkylene glycols such as polyethylene glycol, and also propane-1,2-diol, propane-1,3-diol, butane-1,3-diol, butane-1,4-diol, hexane-1,6-diol and isomers, neopentyl glycol or neopentyl glycol hydroxypivalate. In addition, it is also possible to use polyols such as trimethylolpropane, glycerol, erythritol, pentaerythritol, trimethylolbenzene or trishydroxyethyl isocyanurate. Particular preference is given to glycerol, ethylene glycol, diethylene glycol, propylene glycol, butanediols, neopentyl glycol, trimethylolpropane. Most preferred is glycerol.

Suitable alcohols are for example monools having one to 6 carbon atoms, preferably up to 4 carbon atoms, more preferably methanol, ethanol, isopropanol and/or n-propanol. Particular preference is given to methanol.

In principle, it is possible to use as amines all compounds known to those skilled in the art for use in polyurethane foams.

The amount of chemical and/or physical blowing agent C) used depends on the desired density of the foam. Blowing agents include water, formic acid, hydrocarbons (particularly c-hexane, n-hexane, c-pentane, n-pentane), halogenated hydrocarbons, esters (particularly methyl formate, ethyl formate, methyl acetate, ethyl acetate). A reduction of the density is also accomplished with the aid of expandable microspheres such as Expancel or by substances which release gas such as azodicarbonamide.

If water and/or formic acid are used as blowing agent, the addition of a hydrophilic isocyanate group-containing polyisocyanate for improving compatibility is highly advantageous. The commercially available hydrophilized isocyanate Bayhydur 3100 (NCO content: 17.4%, average NCO functionality: 3.2 (by GPC), monomeric HDI: 0.1%, viscosity (23° C.): 2800 mPas) from Covestro AG is an example of a hydrophilic isocyanurate group-containing polyisocyanate based on 1,6-diisocyanatohexane (HDI). Other hydrophilic isocyanate group-containing polyisocyanates from other manufacturers are also suitable here. An in situ preparation of hydrophilized isocyanates before or during the foaming reaction is also feasible by addition of suitable monofunctional or polyfunctional hydrophilic isocyanate-reactive compounds such as polyethers and other compounds known to those skilled in the art.

To achieve a low thermal conductivity, it is preferable to use hydrocarbons or halogenated hydrocarbons. Particularly suitable hydrocarbons are e.g. c-hexane, n-hexane, c-pentane, n-pentane, of good suitability are halogenated hydrocarbons, especially to be used nowadays, owing to the high ozone-degrading potential of the formerly widely used chlorofluorocarbons, are fluorohydrocarbons such as, e.g. 1,1,1,3,3-pentafluoropropane (HFC-245fa), 1,1,1,3,3-pentafluorobutane (HFC-365mfc), 1,1,1,2,3,3,3-heptafluoropropane, 1,1,2,2,3,3,4,4,5,5,6,6-dodecafluorocyclohexane, 1,1,2,2,3,3,4,4,5,5,6-undecafluoro-6-(trifluoromethyl)cyclohexane, esters such as e.g. methyl formate, ethyl formate, methyl acetate, ethyl acetate).

Halogenated hydrocarbons can be used advantageously as sole blowing agent, but can also be used in combination with additional physical blowing agents.

In the case of formation of foams from polyol/water mixtures and isocyanate or polyisocyanate, catalyzed systems are preferably used. In a particularly preferred embodiment, the isocyanurate formation and the carbon dioxide evolution during formation of urea with the catalysts are matched to each other so that the resulting gas can be employed for frothing the isocyanurate-urethane-urea foam framework. In one particular embodiment, the rate of formation of the framework and carbon dioxide is greater than the rate of diffusion of carbon dioxide from the foam system so that only a negligible amount of blowing gas in a relatively slow diffusion reaction diffuses out unused. Control of the diffusion reaction is known to those skilled in the art (Peter Atkins (1998), Physical Chemistry (6$^{th}$ edition), p. 825ff, Ann. Rev. Phys. Chem., 34, 493, 1983).

In particular it is preferable in the process according to the invention that the catalyst (trimerization catalyst) is selected from the group consisting of:
ammonium formate, ammonium acetate, ammonium octanoate, tin(II) acetate, tin(II) octoate, tin(II) ethylhexanoate, tin(II) laurate, dibutyltin diacetate, dibutyltin dilaurate, dibutyltin maleate, dioctyltin diacetate, sodium acetate, sodium octoate, sodium ethylhexanoate, potassium formate, potassium acetate, potassium ethylhexanoate, potassium octoate, sodium hydroxide, sodium methoxide, potassium methoxide, sodium ethoxide, potassium ethoxide and further alkoxides and mixtures thereof, particularly preferably from the group consisting of: sodium acetate, sodium octoate, sodium ethylhexanoate, potassium formate, potassium acetate, potassium ethylhexanoate, potassium octoate, sodium hydroxide, sodium methoxide, potassium methoxide, sodium ethoxide, potassium ethoxide and mixtures thereof.

Rigid foams according to the invention are predominantly to completely closed-cell. In addition, fine-celled rigid foams as products of the process according to the invention are preferred over coarse-celled. For this reason, the use of one or more foam stabilizers D) is provided according to the invention. Suitable as foam stabilizers, especially for producing fine-celled foams, are silicone surfactants and preferably siloxane-polyoxyalkylene copolymers and especially polydimethylsiloxane-polyoxyalkylene copolymers. Other foam stabilizers may also be used as foam stabilizers such as ethoxylated fatty alcohols and alkylphenols, fatty acid-based amine oxides and betaines and esters of castor oil or ricinoleic acid, and also mixtures of the aforementioned compounds. In terms of the silicone surfactants, particular preference is given to hydrophilic, ethylene oxide-rich, polysiloxane-polyoxyalkylene copolymers. These are commercially available, for example under the trade names Tegostab® B8421, Tegostab® B8490, Tegostab® B8444 (all from Evonik Industries AG) and are suitable particularly for chemically foamed foams, that is to say, for example combined with the use of water and/or formic acid as blowing agent C). Preferred more hydrophobic foam stabilizers D) are more propylene oxide-rich polysiloxane-polyoxyalkylene copolymers. These are commercially available, for example under the trade names Tegostab® B84702-LV, Tegostab® B8870 and are suitable particularly for physically foamed foams, that is to say those which are produced using, for example, hydrocarbons and/or fluorohydrocarbons as blowing agents C).

The rigid PIR foams according to the invention can furthermore be produced using preferred auxiliaries and additives E) known to those skilled in the art, such as flame retardants for example, particularly preferably triethyl phosphate (TEP), tris(2-chloroisopropyl) phosphate (TCPP), emulsifers, catalyst additives such as 1,8-diazabicyclo[5.4.0]undec-7-ene (DBU), etc. The additives E) particularly preferably comprise flame retardants, especially triethyl phosphate (TEP), tris(2-chloroisopropyl) phosphate (TCPP).

Further examples of additives E) optionally to be used in accordance with the invention are emulsifiers, reaction retardants, stabilizers in respect of aging and weathering effects, plasticizers, inorganic flame-retardant substances, phosphorus- or halogen-containing organic flame retardants, fungistatic and bacteriostatic substances, pigments and dyes and also customary organic and inorganic fillers known per se. Emulsifiers include, for example, ethoxylated alkylphenols, alkali metal salts of fatty acids, alkali metal salts of sulfated fatty acids, alkali metal salts of sulfonic acids and salts of fatty acids and amines. Further details of the mode of use and mode of action of the aforementioned auxiliaries and additives are described for example in Kunststoff-Handbuch [Plastics Handbook], Polyurethanes, Vol VII, Carl Hanser Verlag, Munich, Vienna, 2nd edition, 1983.

The individual components are foamed in accordance with the invention to the rigid PIR foam, with concomitant use of a polyol component B), at indices of 200 to 5000, preferably 250 to 4000, particularly preferably 300 to 3000, more preferably of at least 500, particularly at least 750, preferably at least 1000, in each case optionally combined with one of the aforementioned upper limits.

It is particularly preferable to mix the components C) (physical blowing agents: hydrocarbons etc.) with the polyisocyanate component A) for at least 5 min to 24 hours prior to foaming.

It is particularly preferable to mix the components B), C), D) and optionally E) with the isocyanate component A) to give an isocyanate-reactive composition prior to foaming. As an alternative, however, fillers may also be mixed into the isocyanate mixture.

The polyisocyanurate foam according to the invention preferably has a Tg>80° C., preferably >100° C., additionally preferably <200° C., particularly preferably <180° C. The Tg can be determined by DSC in accordance with DIN EN ISO 11357-1.

The present invention especially relates to the following embodiments:

1. Polyisocyanurate foam obtainable by reacting a mixture in the presence of a catalyst and optionally an initiator, comprising:
    A) a polyisocyanate component comprising at least one aliphatic polyisocyanate;
    B) a component reactive to isocyanate comprising at least one polyol and/or an alcohol and also optionally an amine;
    C) at least one blowing agent;
    D) at least one foam stabilizer and
    E) optionally at least one additive,
    characterized in that
    the mixture has an index of at least 200.
2. Polyisocyanurate foam according to embodiment 1, characterized in that the polyisocyanate component A) has a proportion of aliphatic polyisocyanates of at least 50% by weight, especially at least 70% by weight, based on the polyisocyanate component.
3. Polyisocyanurate foam according to embodiment 1 or 2, characterized in that the aliphatic polyisocyanate comprises oligomeric polyisocyanurates based on 1,6-hexamethylene diisocyanate and/or 1,5-pentamethylene diisocyanate and/or mixtures of the same and optionally additionally 4,4'-methylenediphenyl diisocyanate.
4. Polyisocyanurate foam according to any of the preceding embodiments, characterized in that the polyisocyanate component A) has a proportion of isocyanate groups of at most 40% by weight, especially at most 30% by weight, based on the total weight of polyisocyanate component A).
5. Polyisocyanurate foam according to any of the preceding embodiments, characterized in that the polyisocyanate component A) has an average NCO functionality of 2.0 to 6.0, preferably 2.3 to 4.5, more preferably 2.5 to 4.
6. Polyisocyanurate foam according to any of the preceding embodiments, characterized in that the polyisocyanate component A) has a viscosity in accordance with DIN EN ISO 3219:1994-10 at 23° C. of 100 to 30 000 mPas, preferably 500 to 25 000 mPas, more preferably 800 to 22 500 mPas.
7. Polyisocyanurate foam according to any of the preceding embodiments, characterized in that the polyol of the component B) reactive to isocyanate has a molecular weight of less than 200 g/mol, preferably less than 150 g/mol, more preferably wherein the polyol is selected from glycerol, ethylene glycol, diethylene glycol, propylene glycol, 1,3-butanediol, 1,4-butanediol, neopentyl glycol, trimethylolpropane or mixtures thereof.
8. Polyisocyanurate foam according to any of the preceding embodiments, characterized in that the blowing agent C) is a physical and/or chemical blowing agent, preferably selected from water, formic acid, hydrocarbons, especially c-hexane, n-hexane, c-pentane, n-pentane, halogenated hydrocarbons, esters, particularly methyl formate, ethyl formate, methyl acetate, ethyl acetate; or from those blowing agents that decompose on heating with evolution of gas, such as preferably ammonium carbonate, sodium bicarbonate, N,N'-dimethyl-N,N'-dinitrosoterephthalamide, p,p'-oxybis(benzenesulfonyl hydrazide), azodicarbonamide, benzenesulfonyl hydrazide, diazoaminobenzene, azodiisobutyronitrile, dinitrosopentamethylenetetramine and para-tert-butylbenzoyl azide or mixtures thereof. Also suitable are materials which expand under the action of temperature, such as Expancel® (Akzonobel B.V., NL).
9. Polyisocyanurate foam according to any of the preceding embodiments, characterized in that the foam stabilizer D) is selected from silicone surfactants, particularly siloxane-polyoxyalkylene copolymers, preferably polydimethylsiloxane-polyoxyalkylene copolymers, ethoxylated fatty alcohols and alkylphenols, fatty acid-based amine oxides and betaines, castor oil esters and ricinoleic acid esters or mixtures thereof.
10. Polyisocyanurate foam according to any of the preceding embodiments, characterized in that the additive E) is selected from flame retardants, emulsifiers, fillers or mixtures thereof.
11. Polyisocyanurate foam according to any of the preceding embodiments, characterized in that the mixture has an index of 200 to 5000, preferably 400 to 4000, most preferably 500 to 3000.
12. Polyisocyanurate foam according to any of the preceding embodiments, characterized in that the mixture comprises or consists of
    80.0 to 98.0% by weight, in particular 87.0 to 97.0% by weight, of polyisocyanate component A),
    0.1 to 10.0% by weight, in particular 0.2 to 6.0% by weight, of component B) reactive to isocyanate,
    1.0 to 10% by weight, in particular 1.3 to 6.0% by weight, of blowing agent C),
    0.1 to 3% by weight, in particular 0.3 to 1.5% by weight of foam stabilizer D) and
    0 to 10% by weight, in particular 0.05 to 5% by weight, of additive(s) E).
13. Polyisocyanurate foam according to any of the preceding embodiments, characterized in that the polyisocyanurate foam has a relative mass loss of at most 2.0% at ≤200° C., determined by thermogravimetry in a nitrogen atmosphere in a temperature range from 20 to 200° C. at a heating rate of 20° C./minute, especially a relative mass loss of at most 1.5%, even more preferably at most 1.0%.
14. Polyisocyanurate foam according to any of the preceding embodiments, characterized in that the polyisocyanurate foam is heat treated in a two-stage process after start of reaction at <100° C. of the starting components before mixing followed by the foaming reaction at a temperature of at least 60° C. over a period of at least 1 hour, especially at a temperature of at least 100° C. over a period of at least 1 hour.

15. Process for producing a polyisocyanurate foam in which a mixture is reacted in the presence of a catalyst and optionally an initiator, which comprises or consists of the following components:
   A) a polyisocyanate component comprising at least one aliphatic polyisocyanate;
   B) a component reactive to isocyanate comprising at least one polyol and/or an alcohol and also optionally an amine;
   C) at least one blowing agent;
   D) at least one foam stabilizer and
   E) optionally at least one additive,
   characterized in that
   the mixture has an index of at least 200.
16. Use of the polyisocyanurate foam according to any of embodiments 1 to 14 as an insulating material, in particular as pipe insulation, as a construction element, as facade insulation, as reactor insulation, as battery insulation, as superheated steam insulation, as insulation for a still, or as weather-resistant insulating material.

EXAMPLES

The present invention will now be more particularly discussed by means of examples:
Determination Methods Used:
The average NCO functionality of component A) is determined by gel permeation chromatography (GPC) unless stated otherwise. Functionality is an expression for the number of reactive groups per molecule, i.e. for the number of potential linkage points in the formation of a network. Polyisocyanates, which are formed, for example, in the trimerization of diisocyanates, do not consist of only one defined type of molecule, but comprise a wide distribution of different molecules having different functionalities. For polyisocyanates, therefore, the average functionality is specified as parameter. The average functionality of polyisocyanates is unambiguously determined by the ratio of number-average molecular weight and equivalent weight and is generally calculated with the aid of the molecular weight distribution determined by gel permeation chromatography.
The viscosity of component A is determined in accordance with DIN EN ISO 3219:1994-10 at 23° C. unless stated otherwise.
Components Used:
Trimerization Catalysts:
   DABCO K15: (potassium 2-ethylhexanoate)
   Desmorapid: 1792 (potassium acetate)
   Sodium methoxide 25% by weight in methanol
Polyol B) Used:
   Glycerol
Foam Stabilizers (Polyether-Polydimethylsiloxane Copolymers):
   Tegostab® B8421:
   Tegostab® B8490
   Tegostab® B 84702 LV:
Polyisocyanates A) Used:
   Desmodur® N3300: Isocyanurate group-containing polyisocyanate based on 1,6-diisocyanatohexane (HDI) having an NCO content of 21.7%, an average NCO functionality of 3.5 (according to GPC), a content of monomeric HDI of 0.1% and a viscosity of 3000 mPas (23° C.).
   Desmodur® N3600: Isocyanurate group-containing polyisocyanate based on 1,6-diisocyanatohexane (HDI) having an NCO content of 23.2%, an average NCO functionality of 3.2 (according to GPC), a content of monomeric HDI of 0.2% and a viscosity of 1200 mPas (23° C.).
   Desmodur® 44 M: 4,4'-Methylenediphenyl diisocyanate
   Desmodur® H: hexamethylene diisocyanate
   Desmodur® 44V20L: Isocyanate based on diphenylmethane-4,4'-diisocyanate (MDI) having an NCO content of 30.5-32.5 and a viscosity of 160-240 mPas (25° C.)
   Bayhydur® 3100: Hydrophilic isocyanurate group-containing polyisocyanate based on 1,6-diisocyanatohexane (HDI) having an NCO content of 17.4%, an average NCO functionality of 3.2 (according to GPC), a content of monomeric HDI of 0.1% and a viscosity of 2800 mPas (23° C.).

Example 1

An isocyanate-reactive composition of 3.75 g of glycerol, 0.50 g of formic acid, 4.37 g of water, 2.10 g of foam stabilizer Tegostab® B8421 and 3.00 g of Dabco® K15 catalyst was mixed with the isocyanate mixture of 200.40 g of Desmodur® N3600, 28.63 g of Bayhydur® 3100 and 57.26 g of Desmodur® H and cast in a mold. The mixture itself was produced using a stirrer at 3730 rpm with 15 seconds mixing time and a raw materials temperature of 23° C. The mold was then placed in an oven at 60° C. The foam had hardened after 2 h.

Example 2

An isocyanate-reactive composition of 9.90 g of glycerol, 3.71 g of formic acid, 1 g of water, 2.10 g of foam stabilizer Tegostab® B8421 and 3.00 g of Desmorapid® 1792 catalyst was mixed with the isocyanate mixture of 140.15 g of Desmodur® N3600, 140.15 g of Desmodur® 44M and cast in a mold. The mold was then placed in an oven at 60° C. The foam had hardened after 12 min. A 2 hour heat treatment at 60° C. followed.

Example 3

An isocyanate-reactive composition of 0.61 g of glycerol, 2.78 g of foam stabilizer Tegostab® B84702 LV, 2.78 g of sodium methoxide 25% dissolved in methanol 75% as catalyst was mixed with an isocyanate-hydrocarbon mixture of 272.12 g of Desmodur® N3600 and 21.70 g of hexane and cast in a mold. The isocyanate-hydrocarbon mixture itself was prepared ca. 1 day beforehand using a stirrer at 3750 rpm and 23° C. raw material temperature. The mold was then placed in an oven at 70° C. The foam had hardened after 4 min.

Example 4

An isocyanate-reactive composition of 15.00 g of glycerol, 2.00 g of foam stabilizer Tegostab® B8421, 34.24 g of cobalt naphthenate (6%) catalyst and 2.85 g of dimethyl sulfoxide (Eur. Polym. J., Vol 18, 549ff, 1982) was mixed with an isocyanate-hydrocarbon mixture of 161.84 g of Desmodur N3600 and 69.36 g of Desmodur® 44M and 14.70 g of hexane and cast in a mold. The isocyanate-hydrocarbon mixture itself was prepared using a stirrer at 3750 rpm and 23° C. raw material temperature. The mold was then placed in an oven at 60° C. The foam had hardened after 6 min. A 2 hour heat treatment at 60° C. followed.

Example 5a

An isocyanate-reactive composition of 1.08 g of glycerol, 1.44 g of foam stabilizer Tegostab® B84702 LV, 2.88 g of Dabco® K15 catalyst, 0.288 g of sodium methoxide 25% dissolved in methanol 75% as catalyst was mixed with an isocyanate-ester mixture of 282.26 g of Desmodur® N3600 and 12.06 g of methyl formate and cast in a mold. The isocyanate-hydrocarbon mixture itself was prepared using a stirrer at 3750 rpm and 23° C. raw material temperature. The mold was then placed in an oven at 105° C. The foam had hardened after 38 min. A 2 hour heat treatment at 70° C. followed.

Example 5b

An isocyanate-reactive composition of 1.08 g of glycerol, 1.44 g of foam stabilizer Tegostab® B84702 LV, 2.88 g of Dabco® K15 catalyst, 0.288 g of sodium methoxide 25% dissolved in methanol 75% as catalyst was mixed with an isocyanate-ester mixture of 282.26 g of Desmodur® N3600 and 12.06 g of methyl formate and cast in a mold. The isocyanate-hydrocarbon mixture itself was prepared using a stirrer at 3750 rpm and 23° C. raw material temperature. The mold was then placed in an oven at 105° C. The foam had hardened after 38 min. A 2 hour heat treatment at 115° C. followed.

Example 6

An isocyanate-reactive composition of 1.13 g of glycerol, 1.51 g of water, 0.875 g of foam stabilizer Tegostab® B8421 and 1.25 g of Desmorapid® 1792 catalyst was mixed at 3600 rpm with an isocyanate mixture of 107.79 g of Desmodur® 3600, 8.29 g of Desmodur® XP2675 and 4.15 g of Bayhydur® 3100 and cast in a mold. The mold was then placed in an oven at 80° C. The foam had hardened after 40 min. A two hour heat treatment at 80° C. followed.

Comparative Example 1

An isocyanate-reactive composition of 72.07 g of Stepanpol® PS-2325 (OH number: 240 mg KOH/g, functionality: 2), 13.86 g of TCPP (tris(2-chloroisopropyl) phosphate), 1.85 g of foam stabilizer Tegostab® B8421, 2.40 g of Desmorapid® 1792, 0.83 g of Jeffcat® DMCHA (cyclohexyldimethylamine) and 1.11 g of water was mixed with an isocyanate-hydrocarbon mixture of 194.03 g of Desmodur® 44V20L and 13.86 g of c/isopentane (30/70) and cast in a mold. The isocyanate-hydrocarbon mixture itself was prepared using a stirrer at 3750 rpm and 23° C. raw material temperature. The mold was then placed in an oven at 60° C. The foam had hardened after 30 s.

Determination of the Mass Loss on Heating:

The polyisocyanurate foams obtained according to examples 1 to 5b and comparative example 1 were investigated with respect to their mass loss on heating. The experiments were carried out in a nitrogen atmosphere at a heating rate of 20° C./minute. The mass loss was determined by means of thermogravimetry by comparison with the respective starting mass. It was found that, surprisingly, the polyisocyanurate foams according to the invention have a distinctly improved temperature resistance.

| Example | Heat treatment | Starting mass loss | Mass loss at 200° C. | Mass loss at 250° C. | Mass loss at 400° C. |
| --- | --- | --- | --- | --- | --- |
| Example 1 | 60° C., 2 h | 195° C. | 0.8% | 1.9% | 10.5% |
| Example 2 | 60° C., 2 h | 230° C. | 0.9% | 1.4% | 24.0% |
| Example 3 | 60° C., 2 h | 190° C. | 0.8% | 1.6% | 5.6% |
| Example 4 | 60° C., 2 h | 200° C. | 0.9% | 6.7% | 29.0% |
| Example 5a | 70° C., 2 h | 250° C. | 0.8% | 1.6% | 5.5% |
| Example 5b | 115° C., 2 h | 250° C. | 0.4% | 0.6% | 3.7% |
| Example 6 | 80° C., 2 h | 245° C. | 0.6% | 1.1% | 6.6% |
| Comparative example 1 | | 135° C. | 3.5% | 7.0% | 40.0% |

The invention claimed is:

1. A polyisocyanurate foam obtained by reacting a mixture in the presence of a catalyst and optionally an initiator, comprising:
   A) 80.0 to 98.0% by weight of a polyisocyanate component comprising at least one aliphatic polyisocyanate;
   B) 0.1% to 10% by weight of a component reactive to isocyanate comprising at least one polyol and/or an alcohol and also optionally an amine;
   C) 1.0 to 10% by weight of at least one blowing agent;
   D) 0.1 to 3.0% by weight of at least one foam stabilizer and
   E) 0 to 10% by weight of at least one additive,
   wherein
   the mixture has an index of at least 200.

2. The polyisocyanurate foam as claimed in claim 1, wherein the polyisocyanate component A) has a proportion of aliphatic polyisocyanates of at least 50% by weight, based on the polyisocyanate component.

3. The polyisocyanurate foam as claimed in claim 1, wherein the aliphatic polyisocyanate comprises 1,6-hexamethylene diisocyanate and/or 1,5-pentamethylene diisocyanate and/or mixtures of the same and optionally additionally 4,4'-methylenediphenyl diisocyanate.

4. The polyisocyanurate foam as claimed in claim 1, wherein the polyisocyanate component A) has a proportion of isocyanate groups of at most 40% by weight, based on the total weight of polyisocyanate component A).

5. The polyisocyanurate foam as claimed in claim 1, wherein the polyisocyanate component A) has an average NCO functionality of 2.0 to 6.0.

6. The polyisocyanurate foam as claimed in claim 1, wherein the polyisocyanate component A) has a viscosity in accordance with DIN EN ISO 3219:1994-10 at 23° C. of 100 to 30 000 mPas.

7. The polyisocyanurate foam as claimed in claim 1, wherein the polyol of the component B) reactive to isocyanate has a molecular weight of less than 200 g/mol.

8. The polyisocyanurate foam as claimed in claim 1, wherein the foam stabilizer D) is selected from silicone surfactants, ethoxylated fatty alcohols and alkylphenols, fatty acid-based amine oxides and betaines, castor oil esters, ricinoleic acid esters or mixtures thereof.

9. The polyisocyanurate foam as claimed in claim 1, wherein the additive E) is selected from flame retardants, emulsifiers, fillers or mixtures thereof.

10. The polyisocyanurate foam as claimed in claim 1, wherein the mixture has an index of 200 to 5000.

11. The polyisocyanurate foam as claimed in claim 1, wherein the polyisocyanurate foam has a relative mass loss of at most 2.0% at ≤200° C., determined by thermogravimetry in a nitrogen atmosphere in a temperature range from 20 to 200° C. at a heating rate of 20° C./minute.

12. The polyisocyanurate foam as claimed in claim 1, wherein the polyisocyanurate foam is heat treated in a two-stage process after start of reaction at <100° C. of the starting components before mixing followed by the foaming reaction at a temperature of at least 60° C. over a period of at least 1 hour.

13. A process for producing a polyisocyanurate foam in which a mixture is reacted in the presence of a catalyst and optionally an initiator, which comprises the following components:

A) 80.0 to 98.0% by weight of a polyisocyanate component comprising at least one aliphatic polyisocyanate;

B) 0.1% to 10% by weight of a component reactive to isocyanate comprising at least one polyol and/or an alcohol and also optionally an amine;

C) 1.0 to 10% by weight of at least one blowing agent;

D) 0.1 to 3.0% by weight of at least one foam stabilizer and

E) 0 to 10% by weight of at least one additive, wherein the mixture has an index of at least 200.

14. An insulating material, a construction element, a facade insulation, a reactor insulation, a battery insulation, a superheated steam insulation, an insulation for a still, or a weather-resistant insulating material comprising the polyisocyanurate foam as claimed in claim 1.

15. The polyisocyanurate foam as claimed in claim 1, wherein the polyisocyanurate foam has a relative mass loss of at most 1.5% at ≤200° C., determined by thermogravimetry in a nitrogen atmosphere in a temperature range from 20 to 200° C. at a heating rate of 20° C./minute.

* * * * *